Patented Jan. 30, 1940

2,188,327

UNITED STATES PATENT OFFICE 2,188,327

COMPOSITION FOR PRESERVATION OF AND COMBINATION WITH LATICES, RUBBER, AND OTHER PROTEINS AND DECOMPOSABLE ORGANIC COMPOUNDS

Charles M. Albion, Newton, Mass.

No Drawing. Application March 26, 1937, Serial No. 133,269. Renewed April 10, 1939

18 Claims. (Cl. 134—17)

This invention relates to compositions adapted to be used or combined with rubber latex and equivalent aqueous dispersions of rubber, or other substances similar in chemical and/or physical properties to rubber, and with other proteins and organic compounds which decompose quickly in ordinary circumstances, for the purpose of preserving natural latex, and other substances, producing latex adhesives, and modifying latex, rubber and other substances in specific respects; and to the useful combinations of latices and other substances with such compositions. Its object is to provide an economical and satisfactory composition of matter suitable for the purposes above indicated, including specifically that of preserving rubber latex at the source of supply, i. e., the rubber plantation, and elsewhere, in substitution for ammonia or supplemental to the ammonia by which latex is normally preserved; to furnish cement or adhesive compositions of which latex is an important, or the main ingredient, and to provide other useful compositions of rubber, latex, other proteins, and nitrogenous substances of various sorts, as more fully set forth in the following specification.

The production of latex adhesives is one important phase of the foregoing object, and in respect to that phase my purposes are to combine in one composition capacity, not only of effecting a superior bond when dry, but of uniting surfaces, to which the cement has been applied, immediately after application and without need of waiting for complete or partial drying; to produce a cement applicable to the flesh side of leather or to the fibrous surfaces of split leather capable of securing a folded over edge of such a leather piece, or binding two such pieces together, with a sufficiently strong instantaneous bond to prevent displacement of the fold or connected pieces in immediately subsequent handling; and to provide modifications of the fundamental composition capable respectively of being vulcanized, of being used as an adhesive with bodies which are more or less bibulous than split leather, of use as a lacquer or color bearing coating, and of combination with dispersed or coagulated forms of rubber to incorporate dyes and pigments therein and carry such coloring matter into masses and bodies of coagulated rubber.

The invention comprises the combination (in the sense in which that term is used in the patent law) of latex with the composition above referred to, such composition itself for all its uses and in all its useful variations and equivalents, with and without the addition of coloring matter, vulcanizing agents and fillers, etc., and useful combinations of such composition and its equivalents with other substances.

For the purpose of generic definition of the invention, the term "latex" as used in the following specification and claims is intended to embrace within the scope of equivalents, not only normal or natural latex, but equivalent artificial or natural aqueous dispersions of rubber or other substances similar or equivalent to rubber for the purposes of this invention, and all useful dilutions and concentrations of such natural or artificial latices, except where the context requires a more specific definition of the term.

This application is a continuation as to all common subject matter of my prior application for Latex adhesives, filed March 10, 1936, Serial No. 68,065.

The essential generic composition consists of a rubber solvent, a plasticiser of rubber, and a wetting agent or so called polarizing agent; and further products consist of combinations of such composition with latex and/or other ingredients. Any solvent of rubber may be used as the first ingredient of the composition and for specific illustration I name tetrahydronaphthalene ($C_{10}H_{12}$), decahydronaphthalene ($C_{10}H_{18}$), turpentine ($C_{10}H_{16}$), anthracene ($C_6H_4(CH)_2C_6H_4$), benzol ($C_6H_6$), xylol ($C_6H_3(CH_3)_2NH_2$), toluol ($CH_3C_6H_5$), Stoddard solvent, benzene, and tetrachlormethane ($CCl_4$).

For the second ingredient I may use either hexahydrophenol ($C_6H_{11}OH$) which is a hydrogenated product of phenol, or hexahydrocresol ($C_6H_{10}CH_3O_6$), or any other phenol or cyclic alcohol having similar chemical structure to hydrogenated products of phenol, and similar chemical and mechanical properties in a cement composition.

For the third ingredient I may use sulfonated castor oil, sulfonated olive oil, or any of the sulfonated alkylene compounds including those having the formula of $C_nH_{2n}.1OSO_3.Na$.

Compositions made of any one of the said solvents, any one of said plasticisers and any one of said wetting agents are soluble in water, alcohol, glycerine and oil.

To make a latex cement, small proportional quantities of a composition made of single ingredients taken from each of the three groups above mentioned are added to latex, either a latex having the normal content of rubber, or a concentration or dilution thereof, or a similar artificial aqueous dispersion of rubber or the like. The following is an illustrative example of proportions suitable to produce a gallon of such a cement:

| | Ounces |
|---|---|
| Normal latex, 38% rubber content | 125 |
| Tetrahydronaphthalene | 1½ |
| Hexahydrophenol | ½ |
| Sulfonated castor oil | 1 |

In making this illustrative cement, the contents of tetrahydronaphthalene, hexahydrophenol and sulfonated castor oil are first mixed together. They are self emulsifying with one another and produce a smooth homogeneous composition soluble in latex serum. This composition is then poured into the latex and mixed by brief stirring. The complete combination is an adhesive having the properties of being quickly adhesive, and of producing a strong permanent bond. The solvent ingredient (tetrahydronaphthalene) has an important function in causing the composition to have a quick bonding effect. The plasticising ingredient (hexahydrophenol) seems to cause a precipitation of rubber on the fibers of leather and other materials to which the cement is applied, when the liquid content of the cement has been largely absorbed, and to produce a tougher and stronger bond after drying of the rubber. It is a stabilizer and homogenizer of the cement composition, preventing separation of the emulsion under temperature changes. It is also a preservative of latex and, in fresh natural latex, prevents decomposition of the proteins in the latex serum. It likewise preserves from decomposition, for more or less extended periods of time, other proteins and decomposable organic compounds. It has further the property of effecting an adhesion of the cement to greasy or oily materials. In itself it is insoluble in water, but when combined with sulfonated castor oil or other of the wetting agents herein named, it is readily emulsifiable in latex. The wetting agent causes a rapid penetration of the water in the composition into the pores and interstices of the goods and a sufficient penetration of rubber to cause a strong interlock of the cement with the fibers of the goods. This rapid dispersion of the water content hastens drying of the rubber content of the adhesive.

Considerable variations in the relative amounts of the several ingredients may be made. In the foregoing example these ingredients are present in the relative proportions of three parts to one part to two parts. They may have also the proportions of two parts to one part to three parts, respectively, and other proportions as well. In the same example also the total quantity of added composition is three ounces to the gallon. It may be as low as ¼ of an ounce, or as much as 6 ounces or more, and intermediate quantities. The latex base, to which such modifying composition, and its equivalents within the range indicated by this specification, may be added with useful effect, may be dilutions or concentrations having a range of proportional rubber contents between 5% and 65%.

Natural latex containing the added composition needs no admixture of ammonia to preserve it from decomposition or deterioration. This added composition may, however, be used in conjunction with ammonia as a preservative, or with latex to which ammonia has previously been added as a preservative, to obtain the other desirable qualities of this invention.

It will be understood from the foregoing description that all compositions consisting of the combination of any of the rubber solvents with any of the plasticisers and any of the wetting agents named and included within the scope of the foregoing classifications, in suitable relative proportions, are within the scope of the protection which I claim. Such illustrative composition and its equivalents may be called latex modifiers as a convenient descriptive name for the further purposes of this specification. I include also within the scope of the invention all combinations of latex with such modifiers which are useful for the purposes mentioned in this specification.

Compounds of latex and latex modifier are usable also as dyes for rubber, whether or not previously compounded with fillers, vulcanizing agents, accelerators, or other substances used in the art of rubber manufacture. For this use a finely divided dry pigment or soluble dye is mixed with the composition. Dyes and pigments of all colors (including black), and white pigment may be thus used. If the pigments are insoluble in the composition, they are provided in such a state of fine division as to remain in suspension in the liquid. The dyes so compounded, on being applied in liquid form to the rubber, as by brushing, surface overflowing, dipping a sheet or formed article of rubber into the liquid, addition to a rubber mix, or otherwise, combine with the rubber and penetrate its substance, carrying the coloring matter into or throughout the mass. The rubber content of the latex in the dye composition remains in the rubber mass or article to which it was applied, after drying out of the evaporable portions.

The modified latex composition may be used also as a lacquer or coating. Being given the desired color effect by addition of suitable pigment, and made less viscous by a proportional increase of the rubber solvent and containing the addition of a filler, such as titanium oxide, compounds of barium, clays, talc or the like, and/or a vulcanizing agent, an anti-oxidant, an accelerator, etc., it may be brushed, sprayed or extruded on or around any surfaces or article to be protected or ornamented. On drying it forms a firmly adherent, smooth and flexible coating. Such coatings are useful, among other things, for the color identification of electric conductor wires, for coating paper, etc.

Mention has been made of leather as an illustration of the materials with which the previously described adhesive may be used effectively. Modifications of the adhesive may be used effectively also with materials which are much more impervious than split leather. To produce a strongly bonding adhesive with wood and other non-bibulous or semi-bibulous materials, a substantially larger proportion of wetting agent than that previously mentioned is used, and casein, hemoglobin, or a similar combinable adhesive colloid, may be added.

A vulcanizable, or self vulcanizing latex compound, may be produced by adding to the latex and modifier combination hereinbefore described, a dispersion of sulphur or sulphur and one or more of the known accelerators of vulcanization.

What I claim and desire to secure by Letters Patent is:

1. A latex preparation comprising an aqueous dispersion of rubber or the like in combination with a relatively small content of a composition composed of tetrahydronaphthalene, hexahydrophenol and a wetting agent.

2. A latex preparation comprising an aqueous dispersion of rubber or the like in combination with a modifying composition amounting in relative volume to from .2% to 10% of the volume of the rubber dispersion and consisting of tetrahydronaphthalene, hexahydrophenol and a wetting agent.

3. A composition of matter comprising a major proportion of an aqueous dispersion of rubber or the like, and minor proportions of a modifying composition consisting of a rubber solvent from the group consisting of tetrahydronaphthalene, decahydronaphthalene, turpentine, anthracene, benzol, xylol, toluol, Stoddard solvent, benzene, and tetrachlormethane; a hydrogenated phenol as a plasticizer; and a wetting agent.

4. A composition of matter comprising a major proportion of an aqueous dispersion of rubber or the like, and minor proportions of a modifying composition consisting of a rubber solvent from the group consisting of tetrahydronaphthalene, decahydronaphthalene, turpentine, anthracene, benzol, xylol, toluol, Stoddard solvent, benzene, and tetrachlormethane; a hydrogenated phenol as a plasticizer; and a sulfonated wetting agent.

5. A composition of matter comprising a major proportion of an aqueous dispersion of rubber or the like, and minor proportions of a modifying composition consisting of a rubber solvent from the group consisting of tetrahydronaphthalene, decahydronaphthalene, turpentine, anthracene, benzol, xylol, toluol, Stoddard solvent, benzene, and tetrachlormethane; a hydrogenated phenol as a plasticizer; and a wetting agent selected from the group consisting of sulfonated castor oil, sulfonated olive soil, and a sulfonated alkylene compound.

6. A composition of matter comprising a major proportion of an aqueous dispersion of rubber or the like and minor proportions of, respectively, a rubber solvent, a plasticizer from the group consisting of hexahydrophenol and hexahydrocresol, and a wetting agent.

7. A composition of matter as set forth in claim 3 in which the content of rubber or the like is between 5% and 65% and the proportional content of the modifying composition is in the order of from one-fourth fluid ounce to twelve fluid ounces to the gallon of said aqueous dispersion.

8. A vulcanizable latex cement comprising an aqueous dispersion of rubber, a rubber solvent from the group consisting of tetrahydronaphthalene, decahydronaphthalene, anthracene, benzol, toluol, Stoddard solvent, benzene and tetrachlormethane, a hydrogenated phenol as a plasticizer, a wetting agent containing sulphur, and an accelerator.

9. A dye for rubber consisting of the composition set forth in claim 3, together with dispersed coloring matter of desired color characteristics.

10. A dye for rubber consisting of the composition set forth in claim 6, together with dispersed coloring matter of desired color characteristics.

11. A lacquer comprising the composition set forth in claim 3, together with a filler, and a vulcanizing agent.

12. A lacquer comprising the composition set forth in claim 6, together with a filler and a vulcanizing agent.

13. A lacquer comprising the composition set forth in claim 3, together with a filler and an anti-oxidant.

14. A lacquer comprising the composition set forth in claim 6, together with a filler and an anti-oxidant.

15. A lacquer comprising the composition set forth in claim 3, together with a filler, an anti-oxidant and a vulcanizing agent.

16. A lacquer comprising the composition set forth in claim 6, together with a filler, an anti-oxidant and a vulcanizing agent.

17. An adhesive having strongly bonding properties with non-bibulous and semi-bibulous materials, comprising the composition set forth in claim 3, together with a gelatinous adhesive colloid.

18. An adhesive having strongly bonding properties with non-bibulous and semi-bibulous materials, comprising the composition set forth in claim 3, together with a combinable adhesive colloid from the group consisting of casein, hemoglobin and the like.

CHARLES M. ALBION.